United States Patent

Seger

[11] Patent Number: 5,992,388
[45] Date of Patent: Nov. 30, 1999

[54] FUEL GAS ADMIXING PROCESS AND DEVICE

[75] Inventor: Hugo Seger, Steckborn, Switzerland

[73] Assignee: Patentanwalt Hans Rudolf Gachnang, Frauenfeld, Switzerland

[21] Appl. No.: 08/981,037

[22] PCT Filed: Jun. 11, 1996

[86] PCT No.: PCT/CH96/00223

§ 371 Date: May 27, 1998

§ 102(e) Date: May 27, 1998

[87] PCT Pub. No.: WO96/41942

PCT Pub. Date: Dec. 27, 1996

[30] Foreign Application Priority Data

Jun. 12, 1995 [CH] Switzerland ............... 1718/95

[51] Int. Cl.$^6$ .................................................. F02M 21/02
[52] U.S. Cl. ........................ 123/470; 123/478; 123/527
[58] Field of Search ................................ 123/470, 494, 123/527, 528, 478

[56] References Cited

U.S. PATENT DOCUMENTS 4,102,313  7/1978  Laprade et al. ................. 123/700

FOREIGN PATENT DOCUMENTS 60-233359  11/1985  Japan .
61-023857  2/1986  Japan .
61-070161  4/1986  Japan .
4-128567  4/1992  Japan ............................ 123/470

*Primary Examiner*—Tony M. Argenbright
*Attorney, Agent, or Firm*—Akin, Gump, Strauss, Hauer & Feld, L.L.P.

[57] ABSTRACT

In an internal combustion engine, natural gas is injected through a nozzle (17) into a curved feeding pipe (13), tangentially and in opposite direction to the flow of combustion air. Two nozzles (17) that are spaced apart in the flow direction and that alternately inject the natural gas are preferably used in order to achieve a homogenous distribution of fuel in the fuel-air mixture. A conical stream (21) ensures an impeccable mixture of gas with the totality of supplied air.

8 Claims, 1 Drawing Sheet

FUEL GAS ADMIXING PROCESS AND DEVICE

BACKGROUND OF THE INVENTION

The object of the invention is a process for admixing fuel gas with the combustion air in an internal combustion engine in which ambient air is introduced into the cylinder head of the engine through a feed pipe and is enriched with fuel gas before introduction into the piston chamber, and wherein the fuel gas is introduced into the feed pipe counter to the flow direction of the combustion air. The object of the invention is furthermore a device for admixing fuel gas with the combustion air in an internal combustion engine, having a feed pipe for combustion air sucked in from the surroundings and having at least one injection nozzle for fuel gas, wherein the injection nozzle is installed counter to the flow direction of the combustion air in the feed pipe.

It has been known for many years, in particular, to operate stationary motors of heat coupling facilities with natural gas. There are also already motor vehicles in operation which are driven by natural gas. The operation of stationary internal combustion engines with natural gas is comparatively unproblematic, because sufficient time is available for an optimal adjustment of the parameters, and once the optimal setting has been reached, it delivers constant values for a long time. The situation appears otherwise with vehicle motors with changing load operation. Most known gas-driven engines are driven in dual fuel operation, that is, natural gas as well as gasoline can be used for operation. Such dual fuel engines fail by far to meet current and future requirements of air quality regulations.

The reason for poor exhaust gas values lies especially in the composition of the natural gas. The natural gas has a quite different chemical composition depending on its origin. The composition can also change within very short intervals of time even with the same origin. The major European distributor organizations for natural gas, which supply their product into the connection conduits of the individual states, admix additional components with the gases arriving from their countries of origin, which accumulate elsewhere as by-products. These are butanes, propanes and/or others.

The standards which are imposed on an admixture of natural gas in combustion air, i.e., air sucked in from the surroundings, necessary for combustion in the motor, are numerous and must be capable of continuous adaptation during the operation of the motor independently of its load status. Consequently, exact maintenance of a stoichiometric proportion does not by itself suffice for attaining a clean, exhaust-gas poor combustion.

In contrast to liquified gases used in a pure state, such as butane and propane, which are already in use in many places for the operation of vehicles, especially for stacker trucks and street cleaning vehicles, a trouble-free admixture of natural gas with combustion air is extremely difficult. Problems also arise, among other reasons, on account of the various densities of the components contained in natural gas. If the admixture of fuel gas/air has not already taken place without difficulty prior to introduction into the piston chamber of the internal combustion engine, then no combustion can take place there, which results in poor exhaust gas values. Without a trouble-free combustion, the use, and especially the expenditure for the use, of natural gas as a fuel for motor vehicles is not justified.

In contrast to the liquified gasses and even to liquid fuels, such as benzene and diesel fuel, additional higher investments are necessary for the storage of natural gas. This namely can only be transported and stored under high pressure or at very low temperatures in the liquid state. This means that not only at gas stations, but also especially in the vehicle as well, the natural gas must be stored in a pressure reservoir. Likewise, pressure lines and/or compressors for liquefaction or cooling tanks for a cooling to minus 176° C. must be continuously available in the entire natural gas transportation chain.

A gas-air admixture device for an internal combustion engine is known from JP-A-61070161, to which the fuel gas is fed in a direction counter to the flow direction of the combustion air and is distributed in the combustion air by means of a conical valve.

Furthermore, a fuel gas feed with a valve, which feeds the fuel gas in a direction counter to the flow direction of the combustion air flow direction, is known from JP-A-60233359. No fuel/air mixture adapted to the number of cylinders to be charged with fuel gas can be generated with the two known devices.

SUMMARY OF THE INVENTION

The object of the present invention thus resides in creating a process and device which permit the admixture of fuel gas with combustion air in an Otto or Diesel vehicular internal combustion engine in stoichiometric proportion, and moreover make possible a trouble-free intermixture of the gas with the combustion air before the entry of the fuel/air mixture into the piston chamber of the internal combustion engine.

This object is accomplished by the process and a device of the type set forth at the outset, wherein at least two injection nozzles are installed at a distance one behind the other in the feed pipe and the fuel gas is introduced at least at two points of the feed pipe spaced one behind the other in the flow direction of the combustion air.

The introduction of the fuel gas in at least two positions of the feed pipe, spaced one behind the other in the flow direction, improves the homogenous admixture between fuel gas and combustion air within the gas column of the fuel mixture moving in the feed pipe to the motor. The distance between the points of introduction or injection of the fuel is laid out corresponding to the number of the cylinders to be charged with fuel and/or their stroke volume. The injection of the fuel takes place alternately at the injection points.

In an especially advantageous embodiment, the feed pipe is formed in a curved shape, and the at least one injection nozzle lies parallel to the direction of air flow at the injection point. The injection nozzle conducts the gas in the form of a cone-shaped shell or of a frustrum-shaped shell counter to the combustion air flow into this. The introduced fuel gas thereby distributes itself over the entire flow cross-section of combustion air and intermixes and/or combines itself with the air oxygen as a consequence of uniform distribution of the fuel gas upon injection.

BRIEF DESCRIPTION OF THE DRAWINGS

The invention is discussed in greater detail on the basis of an illustrated embodiment, wherein.

DETAILED DESCRIPTION OF THE INVENTION

Figure 1:
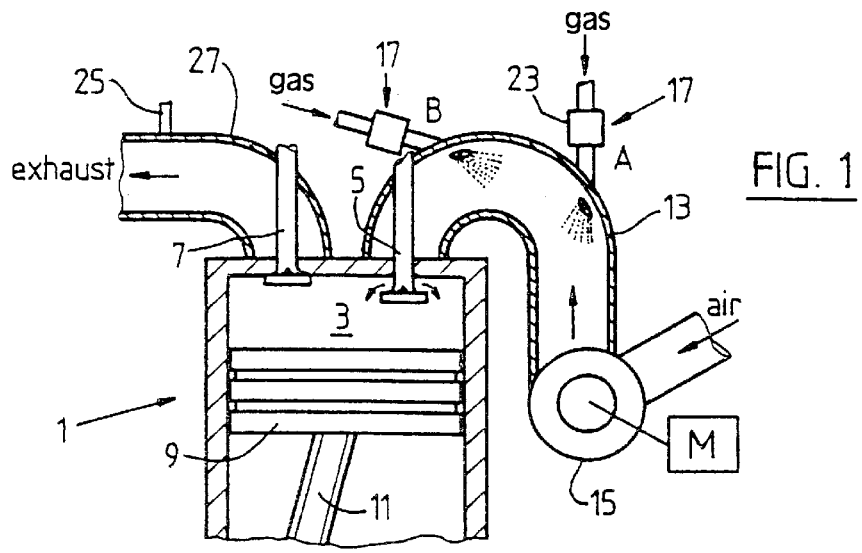
FIG. 1 is a cross section through a curved feed pipe with injection nozzles on the cylinder head of an internal combustion engine.
Figure 2:
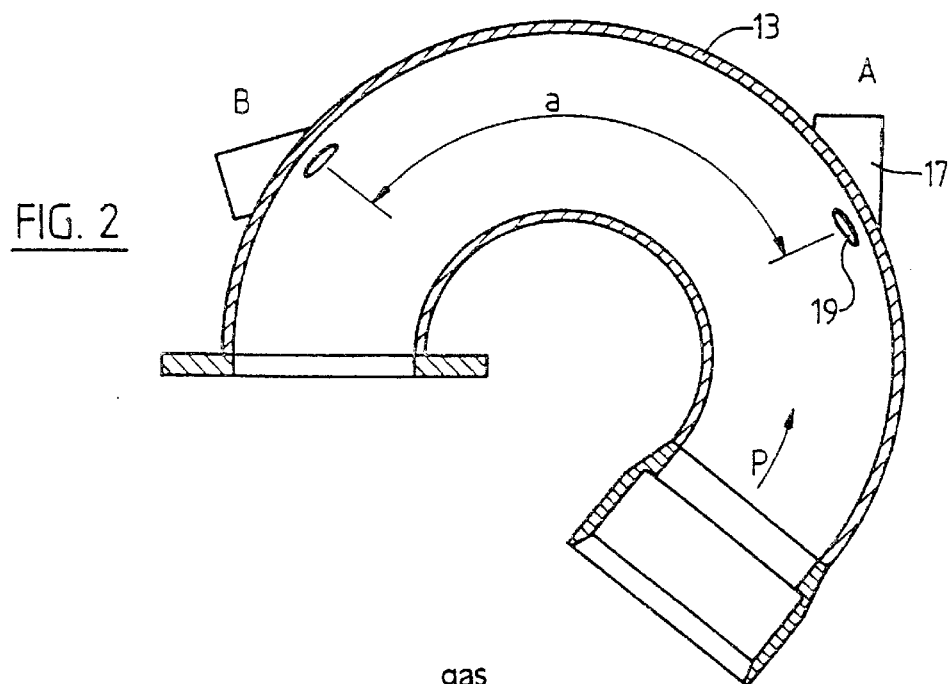
FIG. 2 is a longitudinal section through the feed pipe in FIG. 1.

A schematically represented upper part of a cylinder head of an internal combustion engine is designated with reference number 1. It can be a Diesel or an Otto motor. Above the piston chamber 3, one inlet valve 5 and one outlet valve 7 are each visible, wherein the inlet valve 5 is open. Furthermore, the piston 9 and the piston rod 11 are shown. The inlet valve 5 lies at the end of a feed pipe 13 for a mixture of fuel and combustion air, which is sucked in from the surroundings. Preferably, the combustion air is compressed by a turbocharger 15 in order to be able to operate with an increased intake pressure. The drive for the turbocharger is represented by a motor M. Naturally, the turbocharger can also be driven by an exhaust gas turbine. A further explanation of the turbocharger will not take place here, since it is sufficiently known from the prior art.

Figure 3:
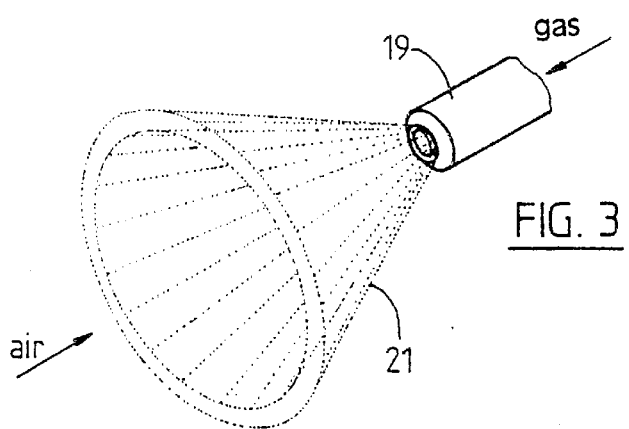
FIG. 3 is a perspective representation of the frustrum-shaped fuel gas inlet.

Two injection nozzles 17 are attached to the feed pipe 13 for injecting natural gas. The direction of injection, i.e., the axes of the injection nozzles, open tangentially to the flow of the combustion air, which is guided by the turbocharger 15 through the feed pipe 13 to the piston chamber 3. The direction of the injection of the gas into the combustion air runs counter to the flow direction P of the compressed air. In an especially advantageous embodiment of the invention, a frustrum shell- or cone shell-shaped gas stream 21 is created by appropriate construction of the nozzle head 19 (FIG. 3). This gas stream 21 can spread over the entire pipe cross section of the feed pipe 13 with appropriate pressure of the fuel gas. In the example represented, identically constructed injection nozzles 17 are arranged at point A and point B. They lie at a distance a, the magnitude of which depends upon the stroke volume of the cylinder 1 and can therefore assume a different value with each motor.

A magnetic valve 23 is installed at each injection nozzle 17, whereby the fuel gas is injectable into the feed pipe 13 during a predetermined time. The time of injection in relation to the momentary position of the piston 9 and the duration of injection are once again dependent upon the size of the cylinder chamber 3, the cross section of the injection nozzle 17 and also the cross-section of the feed pipe 13, as well as additional parameters which are not specified in greater detail here. The control of the time point of injection and the duration of injection are taken over by a motor control (CPU) which also evaluates the values of a lambda probe 25 in the exhaust conduit 27.

Assuming that the motor is fed a fuel gas of known and, at the same time, constant composition, the admixture of fuel gas takes place through the injection nozzles 17 in a stoichiometric proportion. The preparation of a stoichiometric mixture is known from conventional internal combustion engines driven by liquid fuels, and appropriate control facilities are commercially available. Consequently, only measures are to be undertaken, which adapt the fuel mixture and its amount to the respective load status of the motor. The measures necessary for this are likewise known from the prior art.

Things behave otherwise when using natural gas, whose composition changes with each filling of the tank. Corresponding probes for determining the composition of the gas stored at the moment are necessary in order to adapt the injection parameters through the motor electronics. The adaptation must, of course, take place with each refilling, even if this is only minor.

The mode of functioning of the mixture preparation, i.e., the admixture of the fuel gas with the combustion air, is explained below.

The turbocharger 15 delivers an amount of compressed air which remains constant for a time t, which is introduced into the feed pipe 13 and guided through this. Fuel gas is now introduced into the air column moving toward the cylinder in the feed pipe 13 alternately by the two injection nozzles 17 during a certain time $t_1$. The flowing compressed air in the feed pipe 13 now flows into the conic shell or frustrum shell-shaped gas stream open below, and the outflowing gas can distribute itself evenly in the air over the cross-section of the feed pipe 13 and enter into chemical compounds with this. As a consequence of the restricted fuel injection duration in the combustion air, only a certain section of the air column, limited in its length, is enriched with fuel. By exact adjustment of the duration of fuel injection and the speed at which the combustion air column proceeds a homogenous distribution of fuel gas within the entire air column situated in the feed pipe 13 can be attained by the alternating activation of the injection nozzles 17. For this purpose, the closing times of the inlet valve 5 and the injection pressure can also be considered by the control facility.

Two injection nozzles 17 are represented in FIG. 1. Without further discussion, and if needed in any given case, even two or more injection nozzles can be provided, distributed over the periphery of the feed pipe 13 especially with larger motors in order to be able to intermix the correspondingly larger gas amounts trouble-free into the likewise greater volumes of combustion air.

The process of the invention for admixing fuel gas can also be used with gas turbines or gas burners.

I claim:

1. A process for admixture of fuel gas with combustion air in an internal combustion engine, comprising the steps of:
   introducing combustion air into a cylinder head (1) of the internal combustion engine through a feed pipe (13); and
   enriching combustion air with fuel gas before introducing combustion air into a piston chamber (3) by introducing the fuel gas into the feed pipe (13) counter to a flow direction (P) of the combustion air, wherein the fuel gas is introduced at at least two points (A, B) along the feed pipe (13), the at least two points being separated by a distance (a) and lying one behind the other in the flow direction (P).

2. The process according to claim 1, wherein the step of introducing fuel gas includes introducing fuel gas at the at least two points (A, B) in an alternating manner.

3. The process according to claim 1, wherein the step of introducing fuel gas includes introducing fuel gas into the feed pipe (13) substantially parallel to the flow direction (P) of the combustion air in the feed pipe (13), the feed pipe (13) having a curved construction.

4. The process according to claim 1, wherein the step of introducing fuel gas includes introducing fuel gas into combustion air in either one of a frustrum shell-shape and a conical shell-shape through an injection nozzle (17).

5. The process according to claim 1, further including the steps of:
   continuously analyzing fuel gas in at least one of the feed pipe to the internal combustion engine and a fuel tank; and
   forwarding a plurality of analysis values to a plurality of engine electronics.

6. The process according to claim 1, further comprising the steps of:
   analyzing fuel gas in at least one of the feed pipe to the internal combustion engine and a fuel tank after filling the fuel tank with fuel gas; and forwarding a plurality of analysis values to a plurality of engine electronics.

7. A device for admixture of fuel gas with the combustion air in an internal combustion engine, comprising:

a feed pipe through which combustion air is sucked into the internal combustion engine from the surroundings, at least two injection nozzles (17) attached to the feed pipe for introducing fuel gas into the feed pipe, wherein the at least two injection nozzles (17) are oriented to introduce fuel gas in a direction counter to a flow direction (P) of the combustion air in the feed pipe (13), and wherein the at least two injection nozzles (17) are installed along the feed pipe separated by a distance (a) and positioned one behind the other in the flow direction (P) of the feed pipe (13).

8. The device according to claim 7, wherein the feed pipe (13) has a curved shape, and the at least two injection nozzles (17) are arranged on an exterior of the feed pipe.

* * * * *